(12) United States Patent
Muhammad et al.

(10) Patent No.: US 8,306,480 B2
(45) Date of Patent: Nov. 6, 2012

(54) SYSTEM AND METHOD FOR TRANSMISSION INTERFERENCE CANCELLATION IN FULL DUPLEX TRANSCEIVER

(75) Inventors: Khurram Muhammad, Dallas, TX (US); Imtinan Elahi, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1291 days.

(21) Appl. No.: 12/017,372

(22) Filed: Jan. 22, 2008

(65) Prior Publication Data

US 2009/0186582 A1    Jul. 23, 2009

(51) Int. Cl.
*H04B 17/00* (2006.01)
(52) U.S. Cl. ............... 455/67.13; 455/63.1; 455/67.11; 455/84; 455/296
(58) Field of Classification Search ............... 455/114.2, 455/76, 106, 109, 78
See application file for complete search history.

(56) References Cited

U.S. PATENT DOCUMENTS

| | | | | |
|---|---|---|---|---|
| 5,444,864 | A * | 8/1995 | Smith | 455/84 |
| 6,507,728 | B1 * | 1/2003 | Watanabe et al. | 455/78 |
| 6,717,980 | B1 * | 4/2004 | Rishi | 375/219 |
| 7,123,591 | B1 * | 10/2006 | Ostertag et al. | 370/281 |
| 7,245,883 | B2 * | 7/2007 | Nakatani et al. | 455/78 |
| 7,706,755 | B2 * | 4/2010 | Muhammad et al. | 455/76 |
| 7,724,840 | B2 * | 5/2010 | McCallister et al. | 375/297 |
| 7,825,745 | B1 * | 11/2010 | Gavin et al. | 333/132 |
| 7,941,105 | B1 * | 5/2011 | McCall et al. | 455/114.2 |
| 7,970,354 | B1 * | 6/2011 | Nicholls et al. | 455/42 |
| 2002/0072344 | A1 * | 6/2002 | Souissi | 455/296 |
| 2006/0009172 | A1 * | 1/2006 | Shamsaifar | 455/114.2 |
| 2007/0105509 | A1 * | 5/2007 | Muhammad et al. | 455/106 |
| 2007/0184782 | A1 * | 8/2007 | Sahota et al. | 455/63.1 |
| 2008/0242245 | A1 * | 10/2008 | Aparin | 455/126 |
| 2009/0213770 | A1 * | 8/2009 | Mu | 370/281 |
| 2010/0039965 | A1 * | 2/2010 | Yamazaki | 370/277 |

OTHER PUBLICATIONS

U.S. Appl. No. 11/712,737, Khurram Muhammad.
Muhammad et al., A Discrete Time Quad-band GSM/GPRS Receiver in a 90nm Digital CMOS Process, Proceedings of IEEE, Sep. 2005, pp. 809-812.
Muhammad et al., The First Fully Integrated Quad-Band GSM/GPRS Receiver in a 90-nm Digital CMOS Process, IEEE J. Sol.-State Cir., vol. 41, No. 8, Aug. 2006.

(Continued)

*Primary Examiner* — Temesgh Ghebretinsae
*Assistant Examiner* — Richard Chan
(74) *Attorney, Agent, or Firm* — Alan A. R. Cooper; Wade James Brady, III; Frederick J. Telecky, Jr.

(57) ABSTRACT

A full duplex transceiver has cancellation circuitry that includes an auxiliary receiver and an auxiliary transmitter. More specifically, an analog received signal that includes transmission signal leakage is provided to a low noise amplifier (LNA), which then provides its output to a main receiver and the auxiliary receiver. The auxiliary receiver includes a portion operable to convert the received signal from the analog domain to the digital domain. The auxiliary receiver additionally includes a cancellation processor that determines the transmission signal leakage and generates a signal based on the determined leakage. This signal generated by the auxiliary receiver is provided to the auxiliary transmitter, which converts the digital signal back to the analog domain and generates a cancellation signal. The analog cancellation signal is fed back and added to the received signal at the input of the LNA. As a result of the feedback system including an auxiliary receiver and an auxiliary transmitter, transmission signal leakage of many types may be canceled from a received signal.

23 Claims, 9 Drawing Sheets

OTHER PUBLICATIONS

Aparin et al., An Integrated LMS Adaptive Filter of TX Leakage for CDMA Receiver Front Ends, IEEE J. Sol.-State Circ., vol. 41, No. 5, May 2006.

Carl J. Weisman, Other Components—Couplers (Chapter 4), The Essential Guide to RF and Wireless, Second Edition, 2002, 2000 by Prentice Hall PTR, Prentice-Hall, Inc., Upper Saddle River, NJ 07458, pp. 90-92.

Duplexer—Wikipedia, the free encyclopedia. http://en.wikipedia.org/wiki/Duplexer, May 17, 2012.

* cited by examiner

SYSTEM AND METHOD FOR TRANSMISSION INTERFERENCE CANCELLATION IN FULL DUPLEX TRANSCEIVER

BACKGROUND

Wireless devices such as cellular telephones and Wi-Fi networking devices require the capability to transmit and receive wireless signals simultaneously. This is accomplished with a full duplex transceiver. FIG. 1 illustrates a conventional full duplex transceiver 100, which includes a signal input portion 102, a transmitter 104, an amplifier 106, an antenna 108, a duplexer 110, an amplifier 112 and a receiver 114.

The data to be transmitted 116 are passed from signal input 102 to transmitter 104. Output 118 from transmitter 104 is amplified by amplifier 106. Output 120 from amplifier 106 is supplied to duplexer 110, which generates transmit signal 121 for transmission out of antenna 108.

The transmission frequency of the transceiver is typically lower than the receiving frequency. Ideally, there is no overlap in the transmission frequency band and the receiving frequency band. In the event that antenna 108 receives a reception signal 122 while transmitting, duplexer 110 separates reception signal 122 from transmit signal 121 to generate receiver signal 124. Receiver signal 124 is amplified by amplifier 112. Amplified received signal 126 is then processed by receiver 114.

Any such full duplex transceiver has an inherent problem with self-interference: transmission interferes with reception in a process called transmission leakage even though there should be no overlap in the bands. Leakage results not only from imperfect duplexer performance in isolating the transmit signal from the reception signal, but also from parasitic coupling paths between multiple elements of the transmission circuitry and the reception circuitry which permit leakage of the transmission signal into the reception signal. Contemporary market pressures push for smaller and smaller transceiver circuits, thus compounding the problem as transmission circuitry is pressed ever closer to reception circuitry.

One solution to the generic problem of transmission leakage, called active cancellation, involves a feedback loop constructed around the low-noise amplifier that amplifies the reception signal. This feedback loop generates a cancellation signal based on input from the low-noise amplifier and from the transmission circuitry. The active cancellation system produces the cancellation signal such that it mimics the inverse of the transmission leakage; hence, by adding the cancellation signal to the reception signal the leakage present within the reception signal is 'cancelled'. Commonly owned, U.S. patent application having Ser. No. 11/712,737, to Khurram Muhammad filed on Mar. 1, 2007, and titled "METHODS AND APPARATUS TO PERFORM NOISE CANCELLATION IN RADIOS," discloses one type of active cancellation. The entire disclosure of Ser. No. 11/712,737 is incorporated herein.

BRIEF SUMMARY

An object of the present invention is to cancel transmission signal leakage from a receiver signal within a full duplex transceiver using cancellation circuitry. In exemplary embodiments of the present invention, cancellation circuitry includes an auxiliary receiver and an auxiliary transmitter. More specifically, an analog received signal that includes transmission signal leakage is provided to a low noise amplifier (LNA), which then provides its output to the main receiver and the auxiliary receiver. The auxiliary receiver includes a portion operable to convert the received signal from the analog domain to the digital domain. The auxiliary receiver additionally includes a cancellation processor that determines the transmission signal leakage and generates a signal based on the determined leakage. This signal generated by the auxiliary receiver is provided to the auxiliary transmitter, which converts the digital signal back to the analog domain and generates a cancellation signal. The analog cancellation signal is led back and added to the received signal prior to input the LNA.

As a result of the feedback system including an auxiliary receiver and an auxiliary transmitter of the present invention, transmission signal leakage of many types may be canceled from a received signal.

An exemplary embodiment of the present invention includes a device for use with a transmission signal generator operable to generate a transmission signal and an antenna operable to transmit a transmit signal and to receive a reception signal. The device comprises a first transmitter, a second transmitter, a duplexer, a combiner, a first receiver and a second receiver. The first transmitter is operable to generate an output signal based on the transmission signal. The second transmitter is operable to generate a cancellation signal. The duplexer is operable to receive a first signal, to receive a second signal, to separate the second signal from the first signal and to generate a duplexed signal, wherein the first signal is based on the output signal and the second signal is based on the reception signal. The combiner is operable to combine a third signal and a fourth signal and to generate a received signal, wherein the third signal is based on the cancellation signal and the fourth signal is based on the duplexed signal. The first receiver is operable to receive a fifth signal based on the received signal. The second receiver is in communication with the second transmitter and is operable to receive a sixth signal and to generate a control signal, wherein the sixth signal is based on the received signal. Further, the cancellation signal is based on the control signal. Still further, a portion of the received signal includes interference based on the first signal.

Additional objects, advantages and novel features of the invention are set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF SUMMARY OF THE DRAWINGS

The accompanying drawings, which are incorporated in and form a part of the specification, illustrate exemplary embodiments of the present invention and, together with the description, serve to explain the principles of the invention. In the drawings.

DETAILED DESCRIPTION

Figure 1:
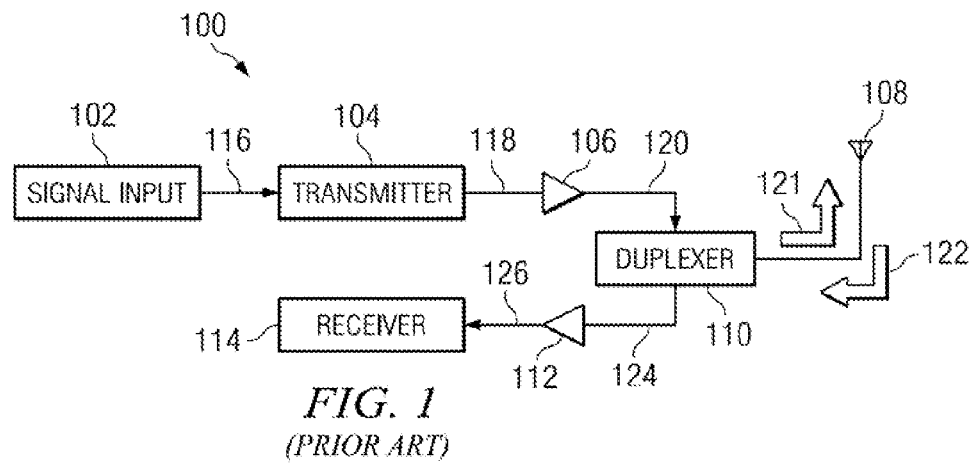
FIG. 1 illustrates a conventional full duplex transceiver.

A full duplex transceiver in accordance with an exemplary embodiment of the invention will now be described with reference to FIG. 2. Transceiver 200 includes signal input 202, main transmitter 204, power amplifier (PA) 206, antenna 208, duplexer 210, low-noise amplifier (LNA) 212, main receiver 214, auxiliary receiver 228, auxiliary transmitter 239 and adder 232.

In this embodiment, signal input 202, main transmitter 204, power amplifier (PA) 206, antenna 208, duplexer 210, low-noise amplifier (LNA) 212, main receiver 214, auxiliary receiver 228, auxiliary transmitter 230 and adder 232 are distinct elements. However, in other embodiments, at least one of signal input 202, main transmitter 204, power amplifier (PA) 206, antenna 208, duplexer 210, low-noise amplifier (LNA) 212, main receiver 214, auxiliary receiver 228, auxiliary transmitter 230 and adder 232 may be included as a single element of transceiver 200.

The data to be transmitted 216 from signal input 202 are passed into main transmitter 204 for processing. Main transmitter 204 may receive data 216 directly from signal input 202. Alternatively, intermediate circuitry may be included to modify data 216 prior to main transmitter 204. Non-limiting examples of intermediate circuitry include amplifiers, filters, resistors, and digital devices including pulse shapers, analog-to-digital converters and digital-to-analog converters, etc.

Output 218 of main transmitter 204 is amplified by PA 206, which generates output signal 219 for duplexer 210. PA 206 may receive output 218 directly from main transmitter 204. Alternatively, intermediate circuitry may be included to modify output 218 prior to PA 206. Non-limiting examples of intermediate circuitry include matching networks, amplifiers, filters, resistors, etc.

Duplexer 210 provides a transmit signal 220 to antenna 208 for transmission. Duplexer 210 may receive output signal 219 directly from PA 206. Alternatively, intermediate circuitry may be included to modify output signal 219 prior to duplexer 210. Non-limiting examples of intermediate circuitry include matching networks, amplifiers, filters, resistors, etc. Similarly, antenna 208 may receive transmit signal 220 directly from duplexer 210. Alternatively, intermediate circuitry may be included to modify transmit signal 220 prior to antenna 208. Non-limiting examples of intermediate circuitry include matching networks, amplifiers, filters, resistors, etc.

In the event that antenna 208 receives a reception signal 222 while transmitting transmit signal 220, duplexer 210 separates reception signal 222 from transmit signal 220 and outputs duplexed signal 224.

Duplexed signal 224 is passed directly to adder 232, which may be implemented as a power combiner. Alternatively, intermediate circuitry may be included to modify duplexed signal 224 prior to adder 232. Non-limiting examples of intermediate circuitry include matching networks, amplifiers, filters, resistors, etc.

Initially, adder 232 passes duplexed signal 224 as modified-duplex signal 233 directly to LNA 212 for amplification and cleaning. As will be discussed later, in a feedback operation, adder 232 will add cancellation signal 238 to duplexed signal 224 to generate modified-duplex signal 233. Alternatively, intermediate circuitry may be included to farther modify modified-duplex signal 233 prior to LNA 212. Non-limiting examples of intermediate circuitry include matching networks, amplifiers, filters, resistors, etc.

Received signal 226 from LNA 212 is passed directly to main receiver 214 for processing and to auxiliary receiver 228 for error cancellation as described in more detail below. Alternatively, intermediate circuitry may be included to modify received signal 226 prior to at least one of main receiver 214 and auxiliary receiver 228. Non-limiting examples of intermediate circuitry include matching networks, amplifiers, filters, resistors, etc.

Although duplexer 210 separates reception signal 222 from transmit signal 220 to an extent, there is a parasitic coupling path wherein leakage signal 240 based on transmit signal 220 leaks into reception signal 222 as interference. Further, there may be additional parasitic coupling paths between PA 206 and LNA 212. This parasitic coupling allows amplifier leakage signal 244, based on transmit signal 220, to be passed to LNA 212 by way of adder 232. There may also be several parasitic coupling paths between main transmitter 204 and LNA 212. This parasitic coupling allows main transmitter leakage signal 242, based on main transmitter output 218, to be passed to LNA 212 by way of adder 232. The present invention compensates for such interferences as described in more detail below.

The combination of leakage signal 240, amplifier leakage signal 244 and main transmitter leakage signal 242 may be considered as a combined aggressor leakage signal 246. Combined aggressor leakage signal 246 may contain very strong undesired leakage at the receiver input, which can compress and distort the receiver front-end if left alone. Auxiliary transmitter 230 generates a cancellation signal 238, which ideally will negatively interfere with combined aggressor leakage signal 246 when added at adder 232, as discussed in more detail below.

Modified duplex signal 233 therefore includes duplexed signal 224, combined aggressor leakage signal 246 and cancellation signal 238. Modified duplex signal 233 is passed to LNA 212. Received signal 226 from LNA 212 is passed to auxiliary receiver 228 for error cancellation. Based on data to be transmitted 216, a local oscillating signal 236 from main transmitter 204 and received signal 226, auxiliary receiver 228 generates a control signal 234 for auxiliary transmitter 230. Auxiliary transmitter generates cancellation signal 238 based on both control signal 234 and local oscillating signal 236.

Figure 2:
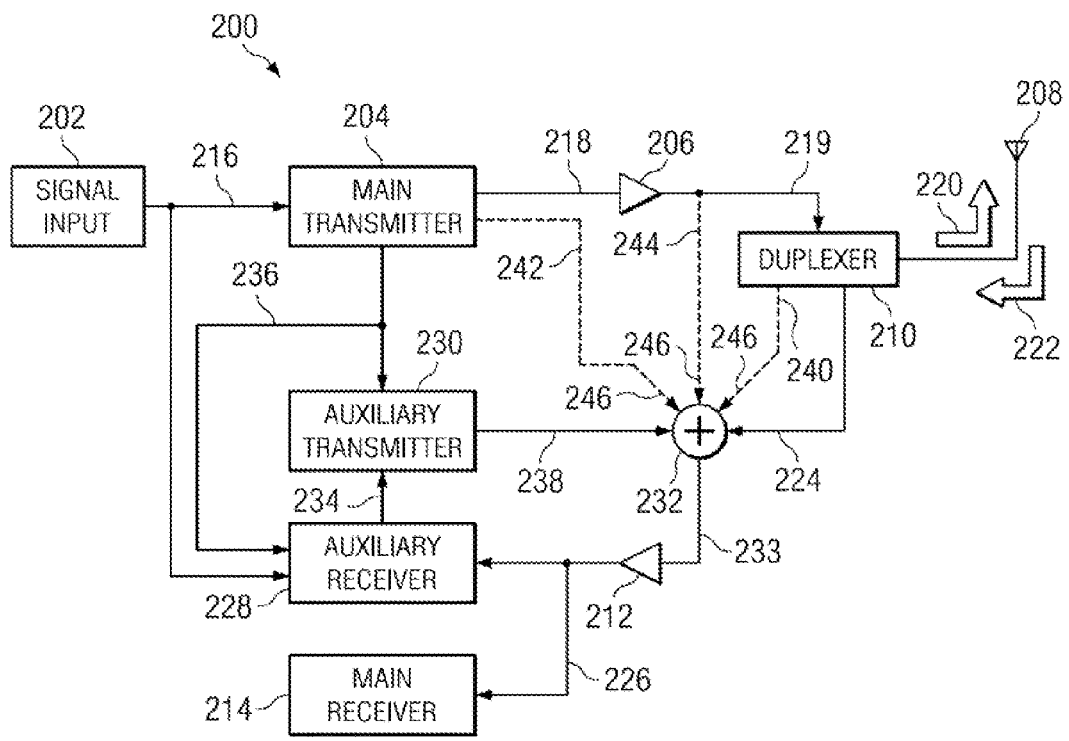
FIG. 2 illustrates a full duplex transceiver in accordance with an exemplary embodiment of the present invention.
Figure 3A:
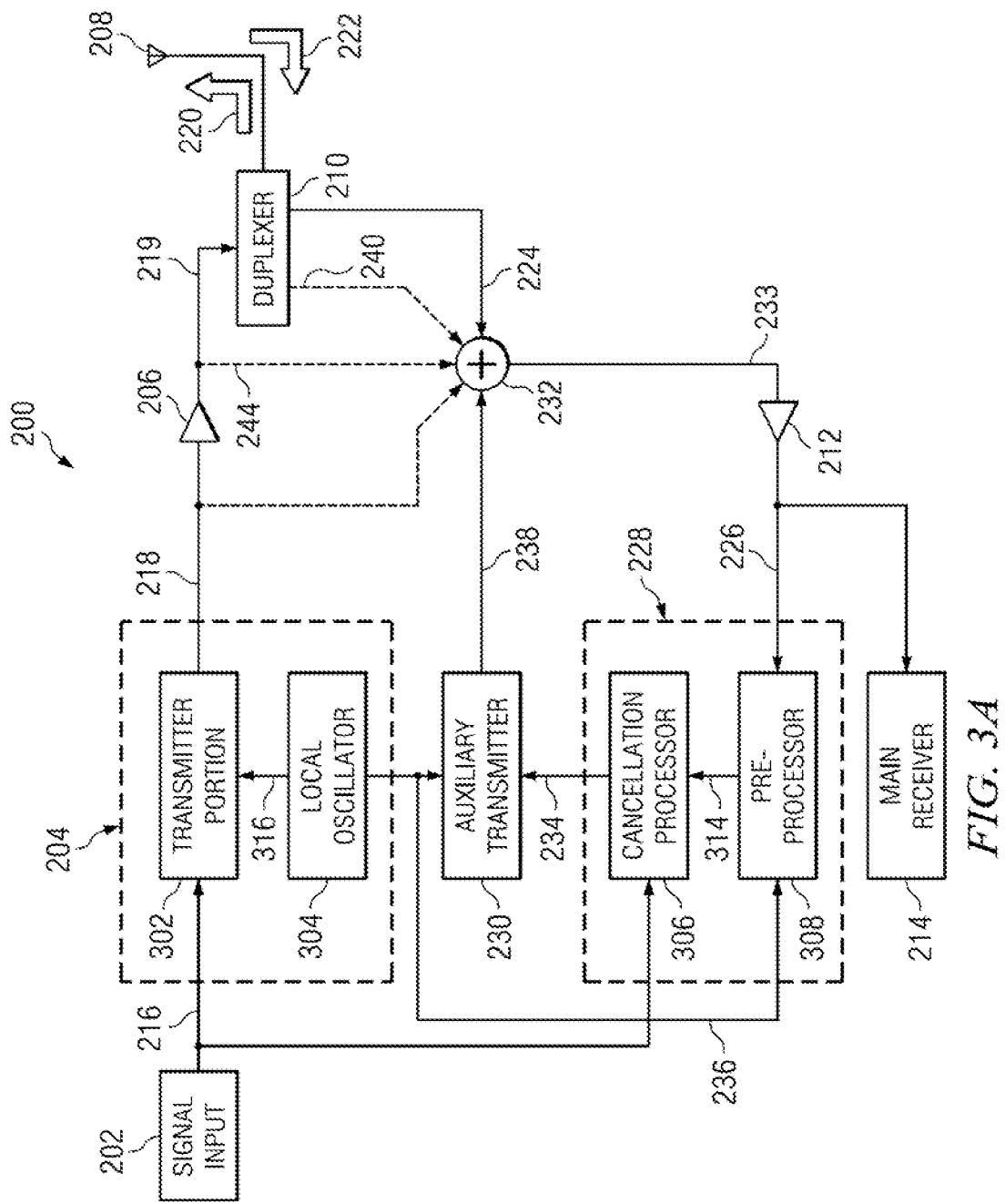
FIG. 3A is a more detailed view of an exemplary full duplex transceiver of FIG. 2.

FIG. 3A illustrates an exemplary transceiver 200 of FIG. 2, wherein main transmitter 204 and auxiliary receiver 228 are provided in more detail. In FIG. 3A, main transmitter 204 is a Cartesian transmitter that includes a Cartesian transmitter portion 302 that, uses an I channel and a Q channel and a local oscillator 304. Local oscillator 304 provides local oscillator signal 316 directly to Cartesian transmitter portion 302, and provides local oscillator signal 236 to auxiliary transmitter 230 and auxiliary receiver 228. Alternatively, intermediate circuitry may be included to modify signal 236 prior to any one of transmitter portion 302, auxiliary transmitter 230 and auxiliary receiver 228. Non-limiting examples of intermediate circuitry include amplifiers, filters, resistors, etc.

Auxiliary receiver 228 includes preprocessor 308 and cancellation processor 306. Preprocessor 308 receives local oscillator signal 236 and received signal 226 and provides error signal 314 to cancellation processor 306. Cancellation processor 306 generates control signal 234 based on error signal 314 and data to be transmitted 216.

A more detailed description of an exemplary transceiver using a Cartesian main transmitter will be described in more detail below with respect to FIG. 10.

Figure 3B:
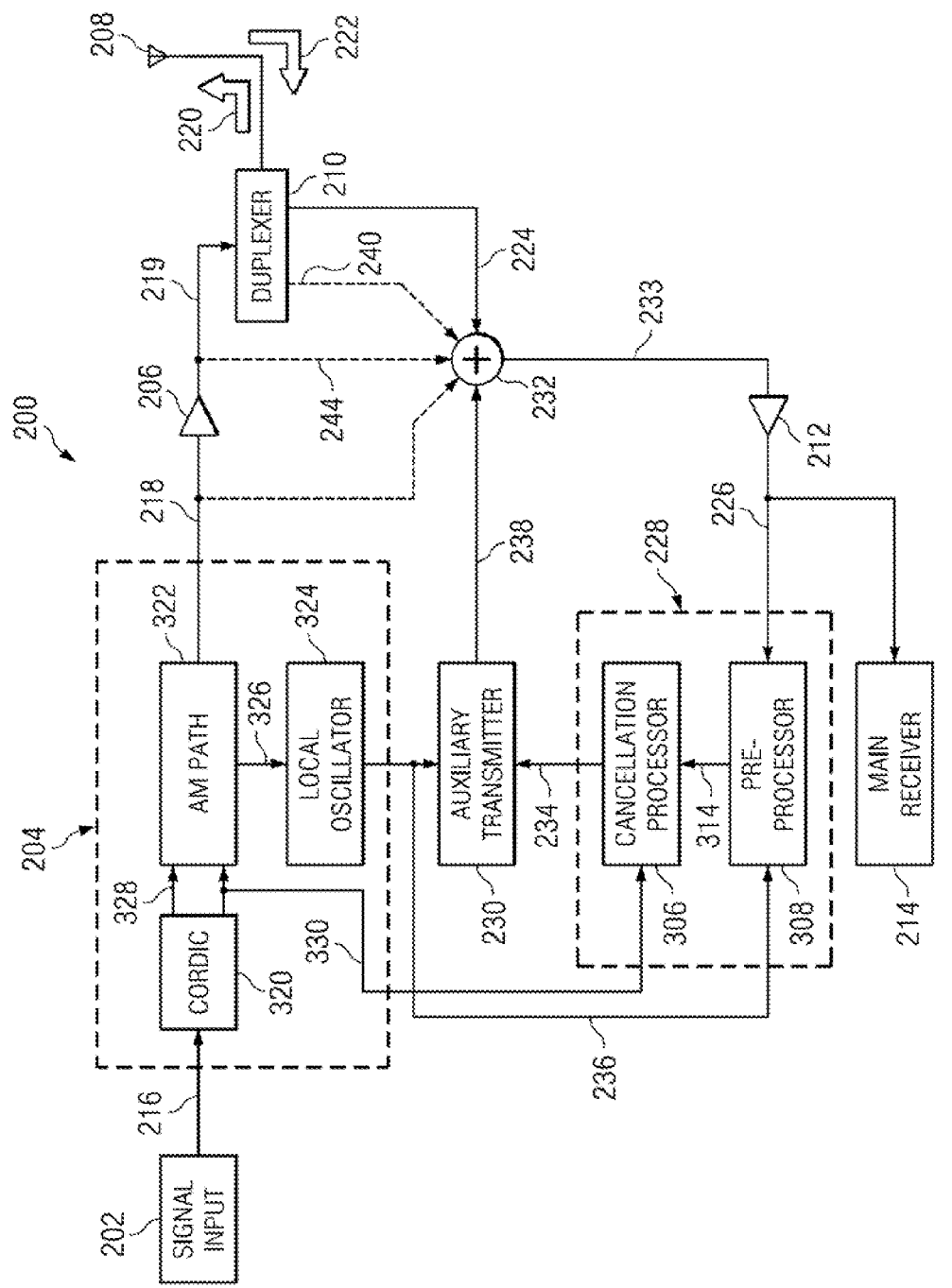
FIG. 3B is a more detailed view of another exemplary full duplex transceiver of FIG. 2.

FIG. 3B illustrates another exemplary transceiver 201 of FIG. 2, wherein main transmitter 204 and auxiliary receiver 228 are provided in more detail. Transceiver 201 of FIG. 3B differs from transceiver 200 of FIG. 3A only in the main transmitter. Specifically, in FIG. 3B, main transmitter 204 is a polar transmitter that includes a coordinate rotation digital computer (CORDIC) 320, and amplitude modulation path 322 and a local oscillator 324. CORDIC 320 transforms input 216 into a phase signal 328 and an amplitude signal 330. Local oscillator 324 receives a phase signal 326 from AM path 322 and provides local oscillator signal 236 directly to auxiliary transmitter 230 and auxiliary receiver 228. Alternatively, intermediate circuitry may be included to modify signal 236 prior to any one of auxiliary transmitter 230 and auxiliary receiver 228. Non-limiting examples of intermediate circuitry include amplifiers, filters, resistors, etc.

A more detailed description of an exemplary transceiver using a polar main transmitter will be described in more detail below with respect to FIG. 12.

Figure 4:
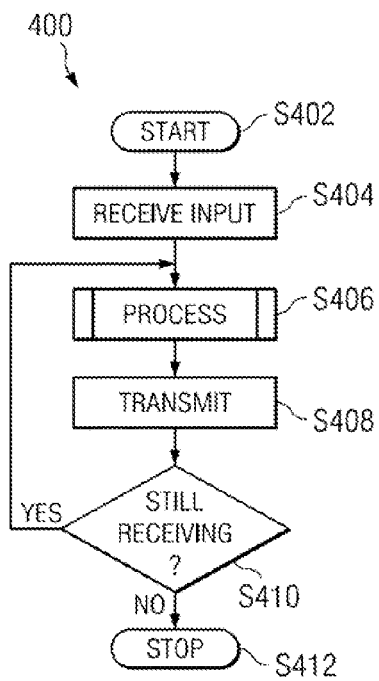
FIG. 4 is a flowchart describing a method for compensating for transmission leakage in accordance with an exemplary embodiment of the present invention.

An exemplary process by which the present invention may minimize the distortion caused by leakage will now be described with respect to FIG. 4. Process 400 begins at start step S402. Next, a reception signal containing transmission leakage is received by transceiver 200 (S404). The reception signal is then processed to compensate for the leakage (S406), and is described in more detail below. Then, a transmit signal is wirelessly transmitted (S408). If transceiver 200 is concurrently receiving a reception signal, process 400 returns to step S404 (S410). When the transceiver stops transmitting a transmit signal, process 400 ends (S412).

As one can see, in accordance with an exemplary embodiment of the present invention, a full duplex transceiver includes not only a main transmitter and main receiver, but an auxiliary transmitter and an auxiliary receiver. The combination of the auxiliary transmitter and auxiliary receiver, with an adder as described below, is used to cancel transmission signal leakage in a received signal. An exemplary auxiliary transmitter in accordance with the present invention will now be described with respect to FIGS. 5-8.

Figure 5:
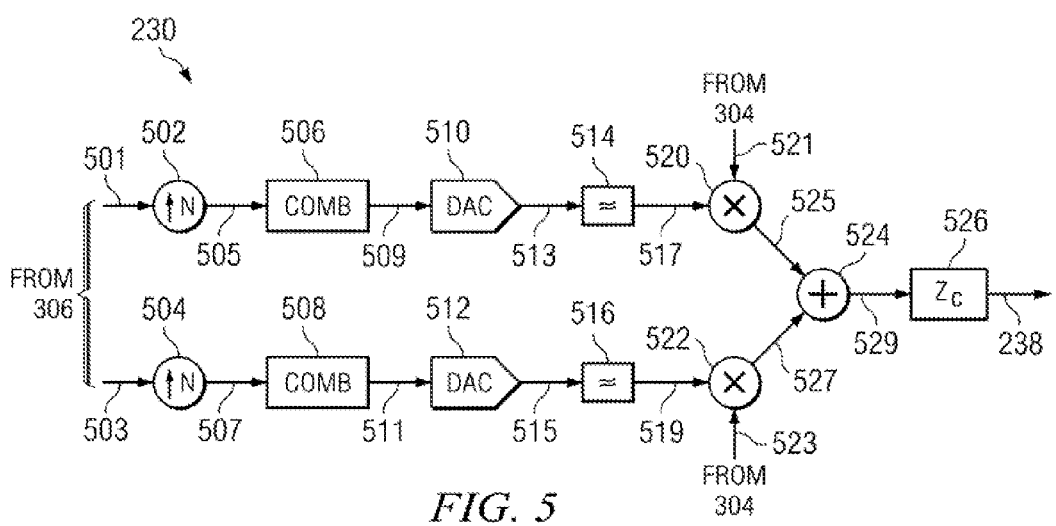
FIG. 5 illustrates a more detailed auxiliary transmitter in accordance with an exemplary embodiment of the present invention.

FIG. 5 illustrates auxiliary transmitter 230 in accordance with an exemplary embodiment of the present invention. Auxiliary transmitter 230 includes op-sampler 502, up-sampler 504, comb filter 506, comb filter 508, digital-to-analog converter (DAC) 510, DAC 512, anti-aliasing filter 514, anti-aliasing filter 516, mixer 520, mixer 522, adder 524, and coupling circuit 526.

In this embodiment, up-sampler 502, up-sampler 504, comb filter 506, comb filter 508, DAC 510, DAC 512, anti-aliasing filter 514, anti-aliasing filter 516, mixer 520, mixer 522, adder 524, and coupling circuit 526 are distinct elements. However, in other embodiments, at least one of up-sampler 502, up-sampler 504, comb filter 506, comb filter 508, DAC 510, DAC 512, anti-aliasing fitter 514, anti-aliasing filter 516, mixer 520, mixer 522, adder 524, and coupling circuit 526 may be included as a single element of auxiliary transmitter 230.

In operation, cancellation processor 306 provides an in-phase (I) channel signal 501 and a quadrature (Q) channel signal 503 to auxiliary transmitter 230. Signals based on I channel signal 501 and Q channel signal 503 are processed in parallel I and Q channel paths; the I channel path includes up-sampler 502, comb filter 506, DAC 510, anti-aliasing filter 514 and mixer 520; and the Q channel path includes up-sampler 504, comb filter 508, DAC 512, anti-aliasing filter 516 and mixer 520.

In-phase (I) channel signal 501 and a quadrature (Q) channel signal 503 are provided at a lower rate than that of the data to be transmitted in the transmission band. Accordingly, I channel signal 501 is up sampled by up-sampler 502, whereas Q channel signal 503 is up sampled by up-sampler 504.

In an exemplary embodiment, each of up-sampler 504 and up-sampler 506 is an 8-bit zero-order hold (ZOH), which may be considered the simplest interpolation filter in terms of hardware complexity. A ZOH reads data a higher rate by incorporating a hardware register running at the higher output clock rate. In the process, the ZOH gives sine filtering with notches at the multiples of input sampling frequency. The transfer function, $H_{ZOH}(Z)$, of an 8-bit ZOH is given by:

$$H_{ZOH}(z) = \frac{1}{8}\sum_{n=0}^{7} z^{-n}. \tag{1}$$

Figure 6:
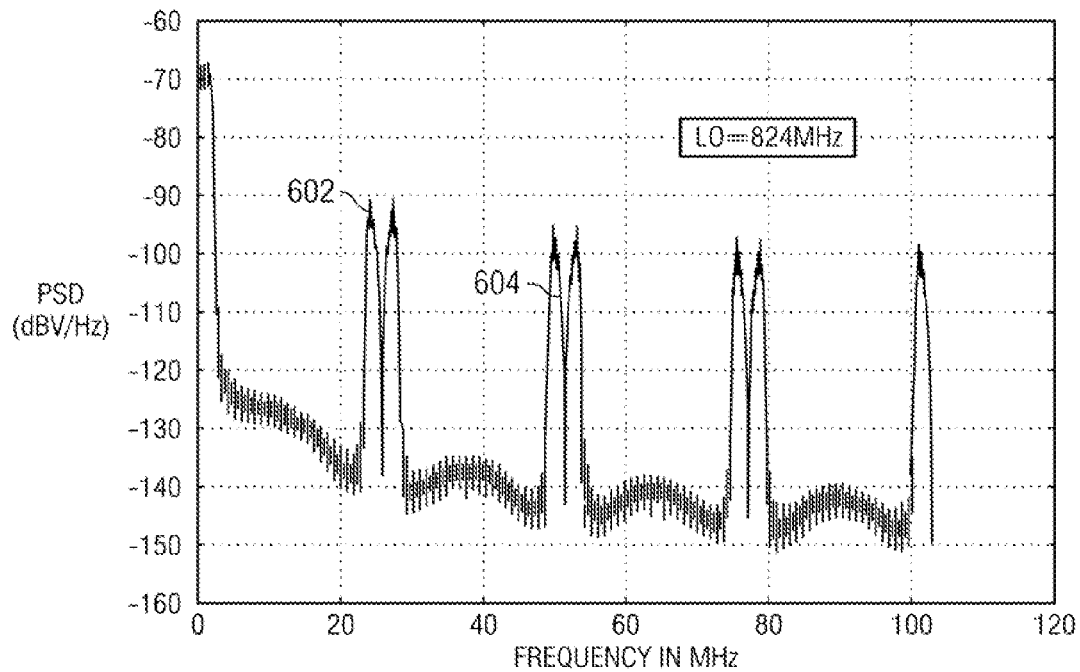
FIG. 6 illustrates a power spectral density (PSD) plot at the output of a ZOH filter for a transmitter having a local oscillating frequency of 824 MHz.

FIG. 6 illustrates a power spectral density (PSD) plot at the output of ZOH filter for a transmitter having a local oscillating frequency of 824 MHz. The corresponding sampling frequency of an exemplary preprocessor 308 filter is 824/32=25.75 MHz. Because the sampling rate of an up-sampler is higher than the sampling rate of the data provided, there are many methods for dealing with determining data for the increased samples. One such method is a zero-insertion method, wherein a data amount for a newly sampled data point is assigned the value of corresponding lower-sampled data point. However, subsequent consecutive newly sampled data points that each correspond to the same lower-sampled data point, are provided with a value of zero. In other words, zeros are inserted. Among other reasons, this method eliminates inaccurate scaling of an input data stream. With zero-insertion, images 602 appear at multiples of 25.75 MHz. Since notches 604 from sine filtering also fall at the same frequencies, images 602 are filtered by at least 20 dB. For example, as illustrated in the figure, at approximately 45 MHz, the image is filtered from approximately −68 dBV/Hz to approximately −95 dBV/Hz.

Returning to FIG. 5, filter 506 reduces noise in the receiver band from op-sampled signal 505, whereas filter 508 reduces noise in the receiver band from up-sampled signal 507. In an exemplary embodiment, each of filter 506 and filter 508 includes a cascade of two digital comb filters.

Figure 7:
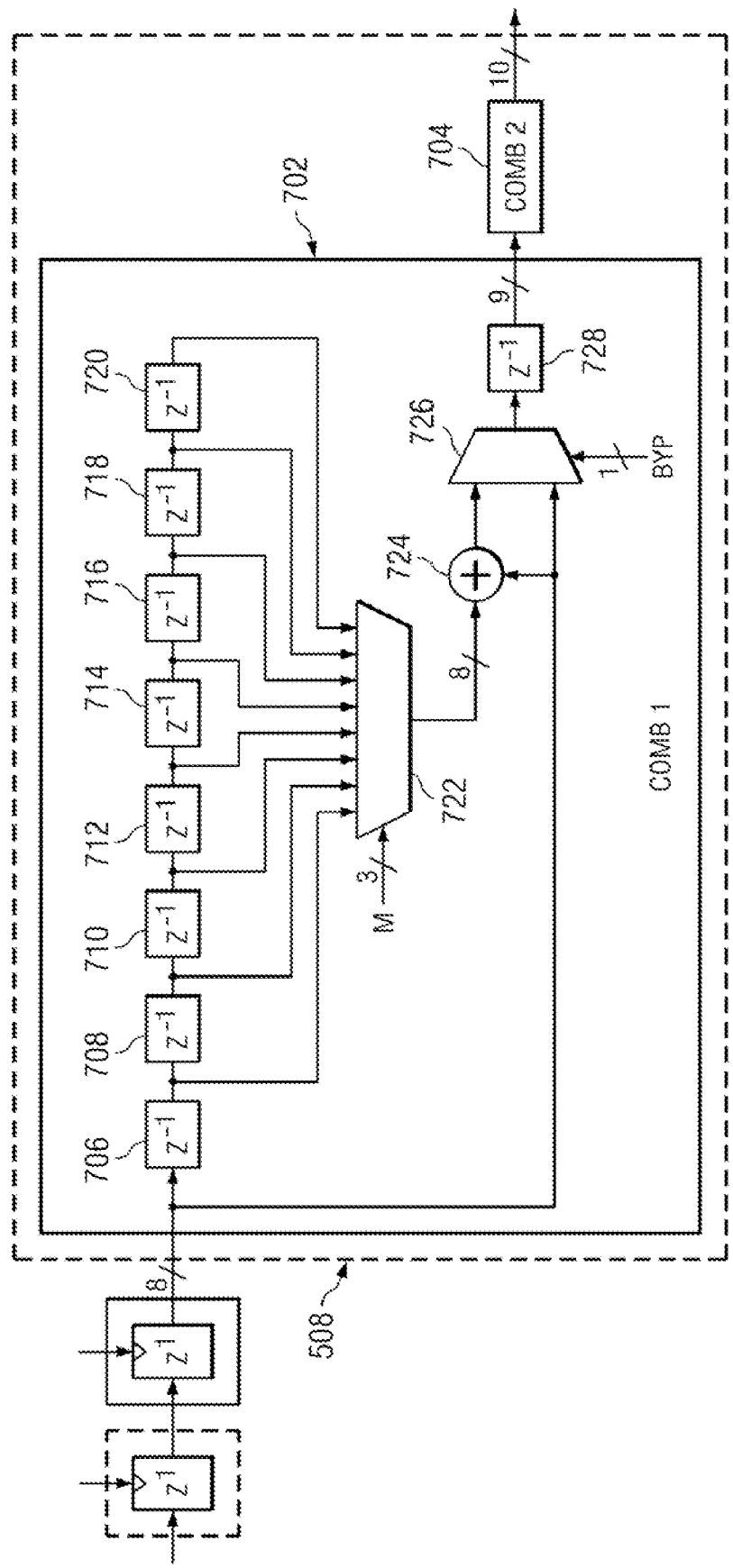
FIG. 7 is an exploded view of filter 508 of FIG. 5, which includes an exemplary cascaded digital comb filter in accordance with an embodiment of the present invention.

FIG. 7 is an exploded view of filter 511, which includes an exemplary cascaded digital comb filter in accordance with an embodiment of the present invention. Filter 702 and filter 704 are programmable and by-passable. For simplicity of discussion, filler 704 is similar to filter 702 and has not been specifically illustrated. As illustrated in the figure, filter 702 includes delays 706, 708, 710, 712, 714, 716, 718 and 720, multiplexer 722, adder 724, by-pass multiplexer 726 and delay 728. The transfer function of each comb filter is given by:

$$H_{COMB}(z) = \frac{1}{2}(1 + z^{-(M+1)}), \quad (2)$$

where M ∈ {0, 1, . . . 7} is a 3-bit control word for multiplexer 722. In operation, the control word may be provided by any known method, such as for example a microprocessor included in the transceiver. The control word is determined based on the spacing of the images 602. In this exemplary embodiment, the spacing is based on an 8-bit resolution. The filtering function may be by-passed via by-pass multiplexer 726, for example in cases where there is no image 602, and thus additional filtering is not required.

Figure 8A:
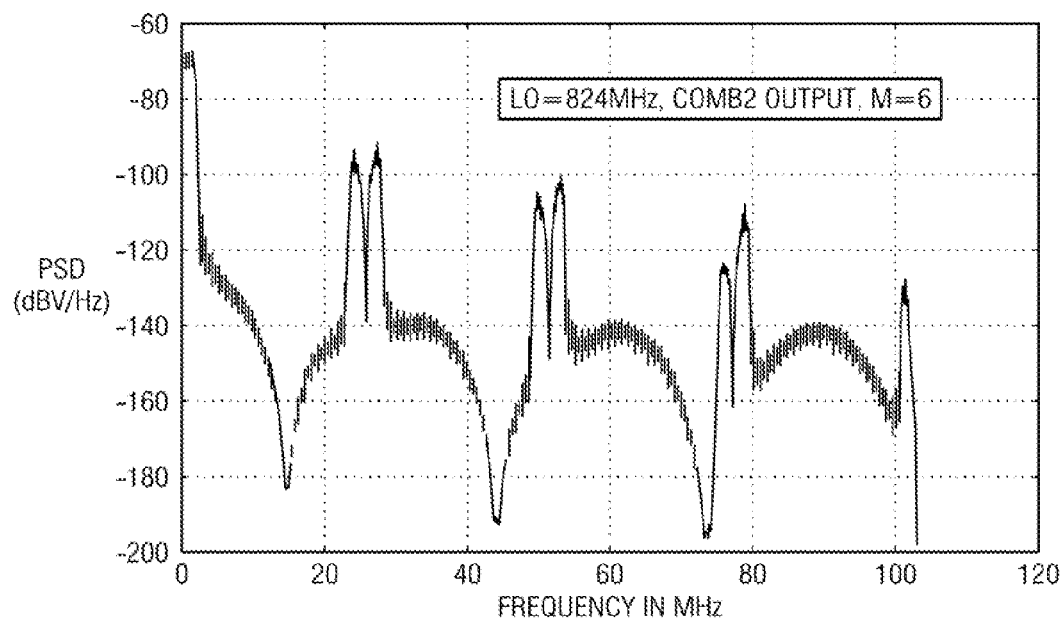
FIG. 8 illustrates the PSD at the output of comb filter 704 of FIG. 7.

FIG. 8A illustrates the PSD at output 509 of comb filter 704 with M=6 for both comb filter 702 and comb filter 704. In general, a comb filter has notches at the following frequencies $$f_N(k) = \frac{F_{SN}(2k + 1)}{2(M + 1)}, \quad (3)$$

where $f_N(k) \leq (F_{SN}/2)$, $F_{SN}$ is the sampling frequency at which comb filter is run, k is a positive integer, and $f_N(k)$ is the notch frequency corresponding to k. For a transmitter local oscillating frequency from local oscillator 304 of 824 MHz, $F_{SN}$824/4=206 MHz and with M=6, the notches appear at 14.71 MHz, 44.14 MHz, 73.57 MHz and 103 MHz.

Figure 8B:
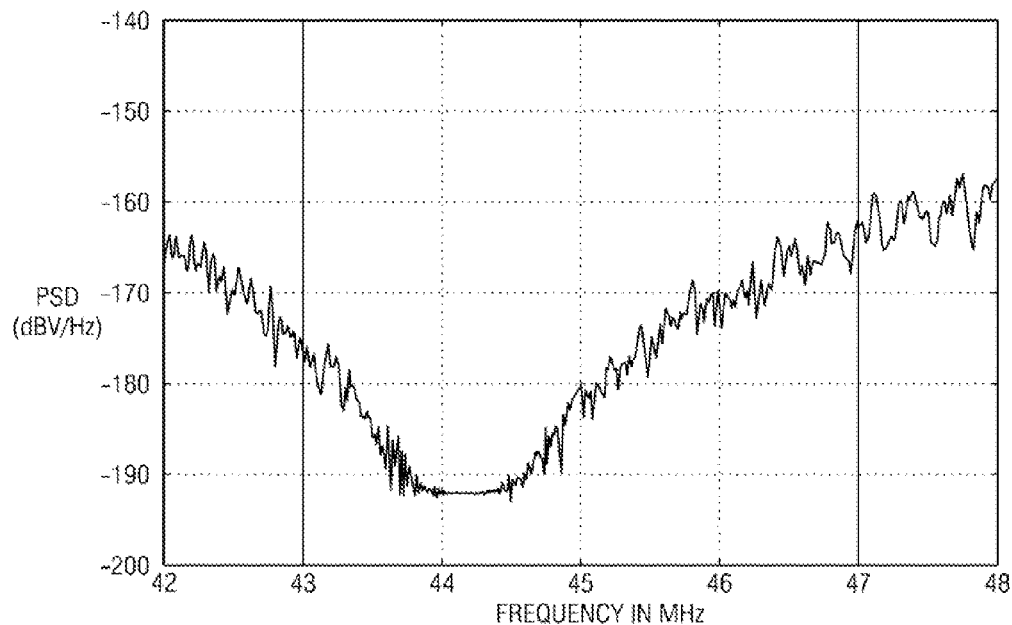

FIG. 8B shows the zoomed PSD around 45 MHz. It is clear in FIG. 8B that the PSD has been reduced by an additional approximately 30 dB compared with the receiving band illustrated in FIG. 6.

A similar analysis was performed for other WCDMA bands to find appropriate values of M, or spacing of the samples which are filtered by a comb filter, across the entire band and the results are tabulated Table 1 below. As illustrated, in the table, in Band V (cellular phone band between a minimum transmission local oscillating frequency of 824 MHz and a maximum transmission local oscillating frequency of 849 MHz) with a receiving frequency offset of 45 MHz, the correct number M is 6.

TABLE

Value of M for various WCDMA bands

| Band | Min. Tx LO (MHz) | Max. Tx LO (MHz) | Rx Offset (MHz) | M |
|---|---|---|---|---|
| I | 1920 | 1980 | 190 | 6 |
| II | 1850 | 1910 | 80 | 6 |
| III | 1710 | 1785 | 95 | 7 |
| IV | 1710 | 1755 | 400 | 3 |
| V | 824 | 849 | 45 | 6 |
| VII | 2500 | 2570 | 120 | 3 |
| VIII | 880 | 915 | 45 | 2 (also 6-7) |

Returning to FIG. 5, comb filter 506 provides an over-sampled 10-bit signal 509 to a Nyquist DAC 510 and comb filter 508 provides an over-sampled 10-bit signal 511 to a Nyquist DAC 512. A first-order anti-aliasing filter 514 removes noise from output signal 513 from DAC 510. Similarly, first-order anti-aliasing filter 516 removes noise from output signal 515 from DAC 512. In an exemplary embodiment, each of filter 514 and filter 516 has a corner frequency at approximately 10 MHz.

Filtered I channel signal 517 and filtered Q channel signal 519 are then up-converted to the output frequency of the main transmitter 204. In particular, mixer 520 mixes filtered I channel signal 517 with signal 521 (sin(ωt)) from local oscillator 304, whereas mixer 522 mixes filtered Q channel signal 519 with signal 523 (cos(ωt)) from local oscillator 304. I channel output 525 from mixer 520 is then combined by combiner 524 with Q channel output 527 from mixer 522.

The up-samplers, filters converters, mixers and the combiner of auxiliary transmitter 239 may introduce noise into signal 529 from combiner 524. As such, in this exemplary embodiment, coupling circuit 526 attenuates signal 529 to reduce the impact of noise generated by the remainder of the elements within auxiliary transmitter 230.

A preprocessor 308 in accordance with an embodiment of the present invention will now be described with reference to FIG. 9.

Figure 9:
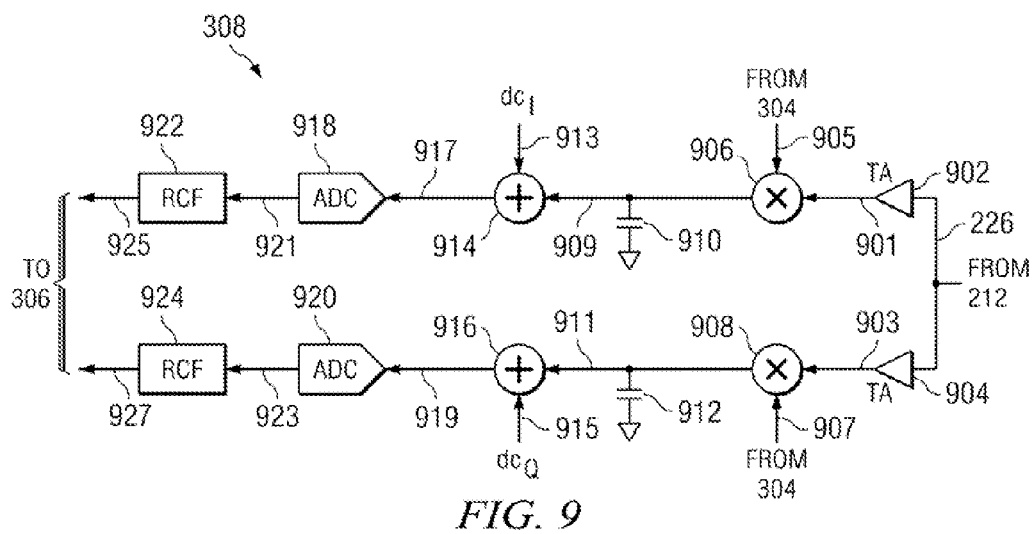
FIG. 9 illustrates a preprocessor 308 in accordance with an exemplary embodiment of the present invention.

As illustrated in FIG. 9, preprocessor 308 includes transconductance amplifier (TA) 902, TA 904, mixer 906, mixer 908, low-pass filter 910, low-pass filter 912, combiner 914, combiner 916, analog-to-digital converter (ADC) 918, ADC 920, rate-change filter (RCF) 922, and RCF 924. Preprocessor 308 processes the I channel and Q channel in parallel, wherein the I channel includes TA 902, mixer 906, low-pass filter 910, combiner 914, ADC 918, and RCF 922, and wherein the Q channel includes TA 904, mixer 908, low-pass filter 912, combiner 916, ADC 920 and RCF 924.

In operation, preprocessor 308 receives signal 226 from LNA 212. Signal 226 is split for processing in the I and Q channels. TA 902 acts as a buffer between LNA 212 and mixer 906. Similarly, TA 904 acts as a buffer between LNA 212 and mixer 908. In particular, in this exemplary embodiment, each of TA 902 and TA 904 ensures that the impedance seen by the load of LNA 212 is not impacted by having a parallel receiver data path to main receiver 214.

In this embodiment, the I channel is mixed via mixer 906 with signal 905 (sin(ωt)) from local oscillator 304 of main transmitter 204, whereas the Q channel is mixed via mixer 908 with signal 907 (cos(ωt)) from local oscillator 304. As such, signals 901 and 903 are converted from the received frequency to the transmission frequency. Signal 909 is then cleaned with low-pass filter 910, whereas signal 911 is cleaned with low-pass filter 912. In an exemplary embodiment, at least one of low-pass filter 910 and low-pass filter 912 has a corner frequency of approximately 20 MHZ.

A goal of preprocessor 308 is to linearly amplify the weak antenna signal such that it can be digitized with sufficient resolution by an analog-to-digital converter before digital decoding. Variations in the received signal strength require an optimum adaptation of the gain, avoiding both distortion due to saturation and noise problems. In this embodiment, signal 909 is combined with a dc offset signal 913 via combiner 914, to compensate for such distortion. Similarly, signal 911 is combined with a dc offset signal 915 via combiner 916.

ADC 918 converts analog signal 917 to digital signal 921. Similarly, ADC 920 converts analog signal 919 to digital signal 923. In an exemplary embodiment each of ADC 918 and ADC 920 is a 1-bit sigma-delta ADC. In particular, in the present exemplary embodiment, a high dynamic range ADC is not needed because cancellation may only be needed when interference based on the transmission signal is strong enough to impact the linearity of main receiver 214. The 1-bit sigma-delta ADC was chosen because area and current consumption of main receiver 214 are relatively small.

Signal 921 from ADC 918 is provided to RCF 922, whereas signal 923 from ADC 920 is provided to RCF 924. Each of RCF 922 and RCF 924 protects the wanted signal band, which is wide enough for both GGE and WCDMA, around DC against aliasing from higher frequencies and filters out noise shaping from ADC 918 and ADC 920, respectively. In an exemplary embodiment, each of RCF 922 and RCF 924 lowers the output rate of the ADC by a factor of 16. The transfer function of such an exemplary filter is given by $$H_{RCF1,FRE}(z) = \left(\sum_{n=0}^{15} z^{-n}\right)^4. \quad (4)$$

The output of such an exemplary RCF filter is $y_{RCF1}(n) = y_{RCF1,FRE}(16n)$. The bandwidth protected is a function of the output sampling rate which is $f_{LO}/32N$, where $f_{LO}$ is LO frequency and N is an integer that equals '1' for low-band operation and '2' for high-band operation.

Signal 925 from RCF 922 and signal 927 from RCF 924 are both provided to cancellation processor 306.

Figure 10:
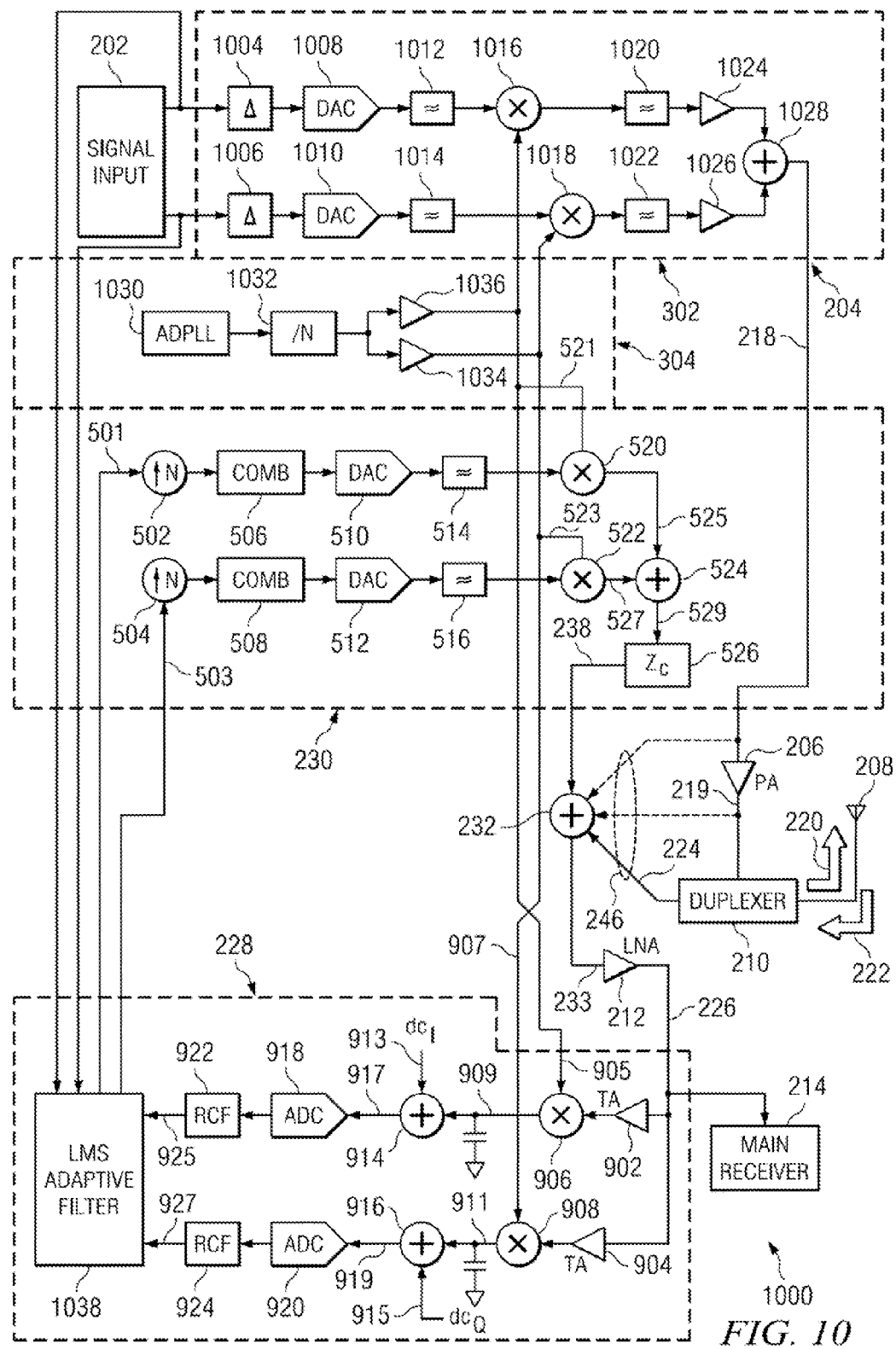
FIG. 10 illustrates a full duplex transceiver in accordance with an exemplary embodiment of the present invention.

FIG. 10 illustrates an exemplary lull duplex transceiver 1000 in accordance with the present invention. Transceiver 1000 includes single input 202, a main Cartesian transmitter 1002, power amplifier 206, antenna 208, duplexer 210, LNA 212, main receiver 214, auxiliary receiver 228 (including preprocessor 308 of FIG. 3), auxiliary transmitter 230 of FIG. 5, and adder 232.

Main Cartesian transmitter 1002 includes a Cartesian transmitter portion 302 and a local oscillator 304. Cartesian transmitter portion 302 includes an adder 1028 and an I channel and a Q channel, which are combined at adder 1028. The I channel includes delay 1004, DAC 1008, anti-aliasing filter 1012, mixer 1016, anti-aliasing filter 1020 and amplifier 1024. The Q channel includes delay 1006, DAC 1010, anti-aliasing filter 1014, mixer 1018, anti-aliasing filter 1022 and amplifier 1026.

Local oscillator 304 includes an all digital phase locked loop (ADPLL) 1030, an N-factor frequency divider sampler 1032, I channel amplifier 1036 and Q channel amplifier 1034. Local oscillator 304 provides the transmission carrier frequency in the I channel ($\sin(\omega t)$) and Q channel ($\cos(\omega t)$) to Cartesian transmitter portion 302, auxiliary transmitter 230 and auxiliary receiver 228.

Auxiliary receiver 228 includes preprocessor 308 of FIG. 9 and subsequent processor such as a digital base-band microprocessor. In an exemplary embodiment, the digital base-band microprocessor comprises an adaptive least-mean-square (LMS) filter 1038 as cancellation processor 306.

In operation, signal input 202 provides a signal to be transmitted. The I channel signal and Q channel signals are processed through Cartesian transmitter portion 302. During such processing, the I channel, signal and Q channel signal are set to the transmission frequency of transceiver 1000 via local oscillator 304. In particular, ADPLL 1030 generates the transmission carrier signal, which is then sampled by N-factor frequency divider sampler 1032. The sampled carrier signal is split for I and Q channels and sent to amplifiers 1036 and 1034, respectively. The I channel transmission carrier signal ($\sin(\omega t)$) is mixed with the I channel signal of Cartesian transmitter portion 302 at mixer 1016, whereas the Q channel transmission carrier signal ($\cos(\omega t)$) is mixed with the Q channel signal of Cartesian transmitter portion 302 at mixer 1018. Now set to the transmission carrier frequency, the I channel signal and the Q channel signal of main transmitter 302 are filtered by anti-aliasing filter 1020 and anti-aliasing filter 1022, respectively. The filtered I channel signal and the filtered Q channel signal of main transmitter 302 are then amplified by amplifier 1024 and amplifier 1026, respectively, and added together by adder 1028 to produce output 218.

Output 218 is amplified by power amplifier 206 before being sent to duplexer 210 for transmission of signal 220 out of antenna 208. In the event that transceiver 1000 receives a signal 222 while transmitting signal 220, duplexer 210 separates signal 220 from signal 222 and send duplexed signal 224 to LNA 212 by way of adder 232.

Signal 226 from LNA 212 is sent to both main receiver 214 for processing and to auxiliary receiver 228. In auxiliary receiver 228, signal 226 is split into I and Q channels as discussed above with respect to FIG. 9. The I channel signal of auxiliary receiver 228 is mixed with the I channel transmission carrier signal ($\sin(\omega t)$) from amplifier 1036 of local oscillator 304. Similarly, the Q channel signal of auxiliary receiver 228 is mixed with the Q channel transmission carrier signal ($\cos(\omega t)$) from amplifier 1034 of local oscillator 304. The I channel signal and the Q channel signal are then processed as discussed above with respect to FIG. 9.

Preprocessor 308 then passes error signal 314, as an I channel signal and a Q channel signal to adaptive LMS filter 1038. Based on the signal from signal input 202 and error signal 314, adaptive LMS filter 1038 generates signal 234, or more specifically, I channel signal 501 and Q channel signal 503.

As discussed above, with respect to FIG. 5, auxiliary transmitter 230 then processes the I channel signal 501 and Q channel signal 503 in parallel. The I channel signal 501 is mixed with the I channel transmission carrier signal ($\sin(\omega t)$) from amplifier 1036 of local oscillator 304. Similarly, the Q channel signal 503 is mixed with the Q channel transmission carrier signal ($\cos(\omega t)$) from amplifier 1034 of local oscillator 304. Ultimately, cancellation signal 238 is generated by auxiliary transmitter 230 and is provided to adder 232.

Adaptive LMS filter 1038 is operable to assess, based on received signal 226, how effectively cancellation signal 238 is compensating for combined aggressor leakage signal 246. The adaptive algorithm of adaptive LMS filter 1038 cannot converge if cancellation signal 238 appears later than combined aggressor leakage signal 246. To make the system causal, delay module 1004 delays I channel input signal and delay module 1006 delays Q channel input signal. Accordingly cancellation signal 238 appears before any signals based on the input signal enter leakage paths 246. As long as combined aggressor leakage signal 246 does not appear earlier than cancellation signal 238, adaptive LMS filter 1038 will converge and will also automatically match the delay introduced by delay modules 1004 and 1006.

A method of operation of full duplex transceiver 1000 of FIG. 10 will now be described with reference to FIG. 11. Process 1100 starts (S1102) and duplexed signal 224 is passed to adder 232 (S1104). Next, adder 232 adds cancellation signal 238, which initially is zero, to duplexed signal 224 (S1106). Added signal 233 is passed from adder 232 to LNA 212. LNA 212 amplifies added signal 233 and passes amplified signal 226 to auxiliary receiver 228 and main receiver 214. In auxiliary receiver 228, signal 226 is set to the transmitter frequency of main transmitter 302, is converted from an analog signal to a digital signal and is provided to adaptive LMS filter 1038. Adaptive LMS filter 1038 then, based on the input signal from signal input 202, analyzes received signal 226 to assess how effectively cancellation signal 238 is compensating for combined aggressor leakage signal 246, determines changes to parameters in adaptive LMS filter 1038 that would ultimately alter cancellation signal 238 to better compensate for transmission leakage (S1108). Based on this determination, adaptive LMS filter 1038 generates error signal 314, which modifies the parameters of adaptive LMS filter 1038 (S1110).

Next, auxiliary transmitter 230 generates a new cancellation signal 238, based on the signal from adaptive LMS filter 1038 (S1112). The new cancellation signal 238 is then added to duplexed signal 224 via adder 232 (S1106).

The above described feedback loop continues until the influence of 246 is reduced below a predetermined threshold.

Figure 12:
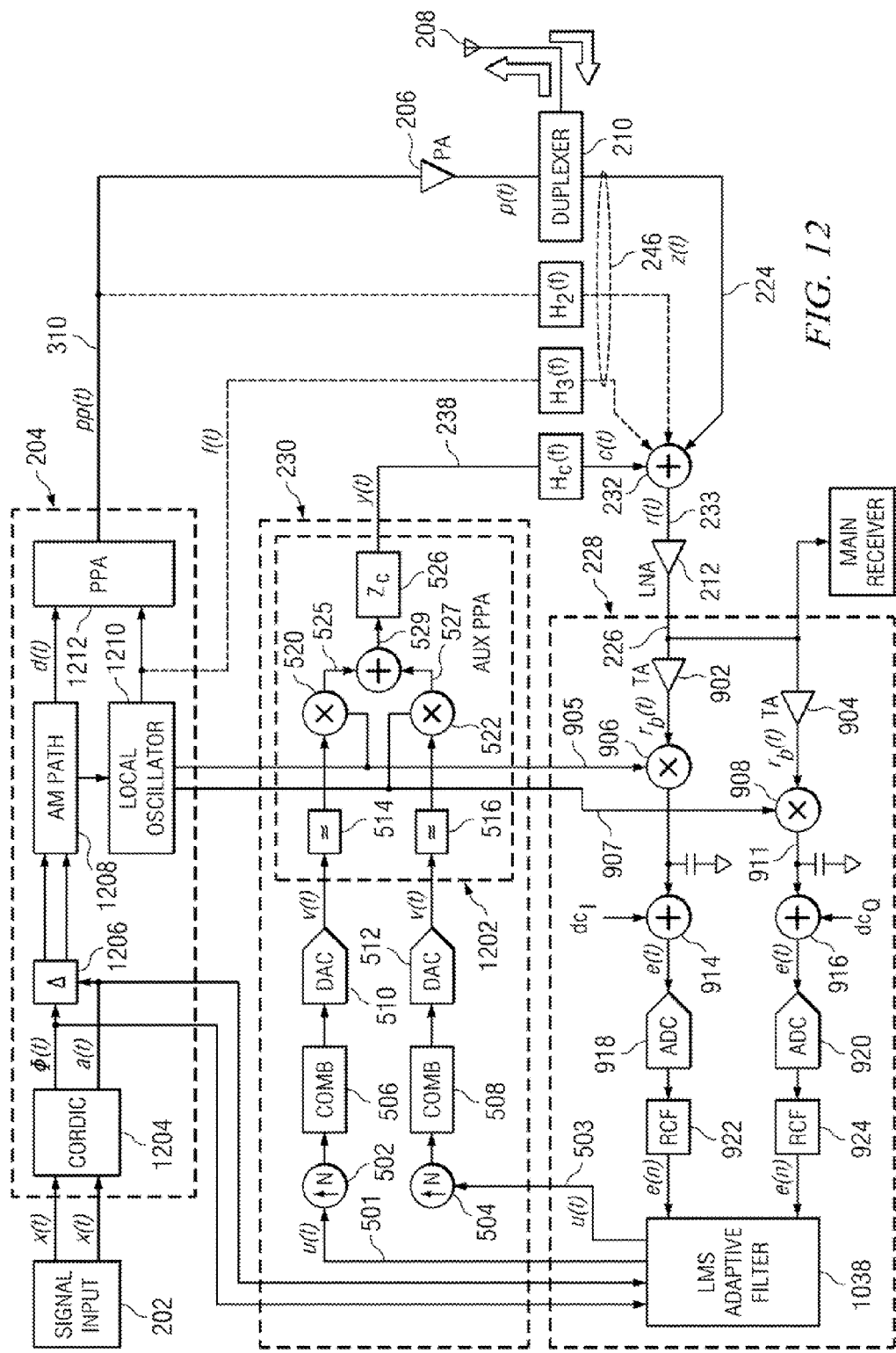
FIG. 12 illustrates a full duplex transceiver in accordance with another exemplary embodiment of the present invention.

FIG. 12 illustrates another exemplary full duplex transceiver 1200 in accordance with the present invention. Transceiver 1200 differs from transceiver 1000 of FIG. 10 in one aspect. Transceiver 1200 included a main Polar transmitter 1202, whereas transceiver 1000 of FIG. 10 includes a main Cartesian transmitter 1002. The remainder of transceiver 1200 is the same as transceiver 1000.

Main polar transmitter 1202 includes CORDIC 1204, a delay module 1206, and amplitude modulated path 1208, a local oscillator 1210, and a pre-power amplifier (PPA) 1212.

Data to be transmitted x(t) emerges from signal input 202, which shapes the signal into pulses suitable for wireless transmission. The Fourier transform of data x(t) is given as $X(f) = \Im\{x(t)\}$. In general, mathematical representation of a given signal in the time domain will be given as g(t), and its representation in the frequency domain will be given as G(f). Data x(t) is passed to CORDIC 1204, which converts data x(t) from Cartesian representation to polar coordinates, producing amplitude signal a(t) and phase signal φ(t). Data x(t) is given as $$x(t)=a(t)e^{j\phi(t)}=Re\{x(t)\}+Im\{x(t)\} \quad (5)$$

Amplitude signal a(t) and phase signal φ(t) are passed to delay module 1206, which ensure causality. After this internal delay has occurred, AM path 1208 up-samples the delayed amplitude and phase signals to a high sampling rate, so as to preserve the spectrum in the transmission RF band, producing amplitude modulated signal d(t). Also subsequent to this internal delay, AM path 1208 passes delayed phase signal to local oscillator 1210. In an exemplary embodiment, local oscillator 1210 is an all digital phase locked loop. Local oscillator 1210 contains a digitally controlled oscillator (DCO) at the transmission carrier frequency. Local oscillator 1210 locks its internal DCO to the phase of the delayed phase signal producing phase-modulated signal f(t). Amplitude-modulated signal d(t) from AM Path 1208 and phase-modulated signal f(t) from local oscillator 1210 are passed to PPA 1212. Amplitude-modulated signal d(t) and phase-modulated signal f(t), and their respective frequency domain representations, D(f) and F(f), are given by equations (6) through (9), below.

$$d(t)=a(t-\Delta_2) \quad (6)$$

$$D(f)=A(f)e^{-j2\pi f\Delta_2} \quad (7)$$

$$f(t)=\cos\{\omega_T t+\phi(t-\Delta_2)\}. \quad (8)$$

Without a loss of generality, equation (8) can be written as $$f(t)=\cos\{\omega_T(t-\Delta_2)+\phi(t-\Delta_2)\}. \quad (9)$$

Then let $$F(f)=\Im\{f(t)\}. \quad (10)$$

In equations (6) through (10), it is assumed that the reference phase provided to PPA 1212 is the cos term (without loss of generality) and that $\Delta_2$ represents the sum of time delay $\Delta_1$ due to delay module 1206 and the delay in AM path 1208. PPA 1212 combines amplitude-modulated signal d(t) and phase-modulated signal f(t) and up-converts them to the carrier frequency $\omega_T$ (given in rad/s) and amplifies the result. Without loss of generality, the output of PPA 1212, PPA output signal pp(t), can be expressed as $$pp(t)=a(t-\Delta_2)\cos(\omega_T t+\phi(t-\Delta_2))*\Im^{-1}\{PPA(f)\} \quad (11)$$

where PPA(f) is the frequency domain transfer function of PPA 1212, and $\Im^{-1}\{\}$ represents an inverse Fourier transform. The operator '*' represents convolution. One will notice that $$a(t)\cos\{\omega_T t+\phi(t)\}=Re\{x(t)e^{j\omega t}\}=\tfrac{1}{2}[x(t)e^{j\omega_T t}+x^*(t)e^{-j\omega_T t}] \quad (12)$$

where x*(t) is the complex conjugate of data x(t) and $\omega_T=2\pi f_T$ is the transmit carrier frequency, so that $$\Im\{a(t)\cos\{\omega_T t+\phi(t)\}\}=\tfrac{1}{2}[X(f-f_T)+X^*(-f-f_T)]=X'(f) \quad (13)$$

Hence, in frequency domain, the output of PPA 1212 can be written as $$PP(f)=X'(f)PPA(f)e^{-j2\pi f\Delta_2} \quad (14)$$

where X'(f) is defined as $$X'(f)=\tfrac{1}{2}[X(f-f_T)+X^*(-f-f_T)] \quad (15)$$

the output signal pp(t) of PPA 1212 is passed to PA 206, which further amplifies PPA output signal pp(t), shaping its output by transfer function PA(f). The output of PA 206, pre-transmit signal p(t), is passed to duplexer 210, which generates transmit signal 220 based on pre-transmit signal p(t). Transmit signal 220 is passed to antenna 208, which wirelessly transmits transmit signal 220. Pre-transmit signal p(t) can be written as $$p(t)=pp(t)*\Im^{-1}\{PA(f)\} \quad (16)$$

and its frequency domain representation is given by $$P(f)=X^*(f)PPA(f)PA(f)e^{-j2\pi f\Delta_2} \quad (17)$$

Combined aggressor leakage signal z(t) will now be derived.

In the event that antenna 208 receives a reception signal 222 while transmitting transmit signal 220, duplexer 210 separates reception signal 222 from transmit signal 220. Although duplexer 210 separates reception signal 222 from transmit signal 220 to an extent, leakage based on pre-transmit signal p(t) leaks into reception signal 222 as interference. Pre-transmit signal p(t) passes through a combination of leakage paths, non-limiting examples of which include a path through duplexer 210, whose overall leakage has an overall impulse response $h_1(l)$ and a frequency domain response of $H_1(f)$. This response may or may not have a linear phase. Generally, duplexer 210 may provide about 45-55 dB of attenuation with a non-linear phase response in the reception band.

Output signal pp(t) from PPA 1212 can also be assumed to leak through several independent paths that are assumed to be static, represented within FIG. 12 as PPA leakage path 1214. A linear combination of phase delayed replicas create an overall vector that can be represented as PPA 1212 output signal pp(t) going through an overall coupling with a gain of α and a phase rotation $\theta_2$. However, to be rigorous, the leakage signal based on PPA 1212 output signal pp(t) will be represented as $PP(f)H_2(f)$, where $H_2(f)$ is the frequency response of PPA leakage path 1214 and $h_2(t)$ is its impulse response.

The DCO within local oscillator 12111 can also be assumed to leak through multiple paths, represented within FIG. 12 as oscillator leakage path 1216. A linear combination of phase delayed replicas create an overall vector that can be represented as f(t) going through an overall coupling of β and a phase rotation $\theta_3$. However, to be rigorous, the leakage signal based on f(t) will be represented as $F(f)H_3(f)$, where $H_3(f)$ is the frequency response of oscillator leakage path 1216 and $h_3(t)$ is its impulse response.

In light of the above, the combined aggressor leakage signal z(t) can then be represented as $$z(t) = p(t)*h_1(t) + pp(t)*h_2(t) + f(t)*h_3(t) \quad (18)$$

and its frequency domain representation is given by $$Z(f) = P(f)H_1(f) + PP(f)H_2(f) + F(f)H_3(f) \quad (19)$$

Then, $$Z(f) = X(f)[PA(f)H_1(f) + H_2(f)]PPA(f)e^{-j2\pi f\Delta_2} + \Phi(f)e^{-j2\pi f\Delta_3}H_3(f) \quad (20)$$

$$Z(f) = [X(f)\{PA(f)H_1(f) + H_2(f)\}PPA(f) + \Phi(f)H_3(f)]e^{-j2\pi f\Delta_2} \quad (21)$$

is the expanded expression that shows the composite leakage signal at the input of adder 232.

Cancellation signal 238, c(t), will be derived next.

Amplitude signal a(t) and phase signal ϕ(t) are shaped by adaptive LMS filter 1038, whose frequency domain response is given by W(f). The outputs of adaptive LMS filter 1038, output signal u(t), include an I path and a Q path and are processed by auxiliary transmitter 230.

The time domain representation of output signal u(t) is given by $$u(t) = a(t)*\mathfrak{I}^{-1}\{W(f)\} \quad (22)$$

and its frequency domain representation is given by $$U(f) = A(f)W(f). \quad (23)$$

Output signal u(t) is up-converted by up-samplers 502 and 504 so as to preserve the spectrum in the transmission RF band. After filtering by comb filters 506 and 508, u(t) is returned to the analog domain by way of DAC 510 and DAC 512.

The frequency domain responses of DAC 758 and DAC 760 are given by S(f). Thus, outputs from DAC 758 and DAC 760, denoted DAC output v(t) (and the frequency domain representation), are given by $$v(t) = u(t)*\mathfrak{I}^{-1}\{S(f)\} = |v(t)|e^{-j\alpha(t)} \quad (24)$$

$$V(f) = U(f)S(f) = A(f)W(f)S(f). \quad (25)$$

Output v(t) is passed to auxiliary PPA 1202, pre-cancellation signal y(t). Pre-cancellation signal y(t) is given by $$y(t) = Re\{v(t)e^{j\{\omega_T t + \phi(t-\Delta_2 i) + \phi_0\}}\} \quad (26)$$

$$y(t) = |v(t)|\cos\{\omega_T t + \phi(t-\Delta_2) + \phi_0 + \theta(t)\} \quad (27)$$

$$y(t) = Re\{v(t)\}\cos\{\omega_T t + \phi(t-\Delta_2) + \phi_0\} - Im\{v(t)\}\sin\{\omega_T t + \phi(t-\Delta_2) + \phi_0\}, \quad (28)$$

where θ(t) represents the phase of DAC output v(t), and where $\phi_0$ is the rotation accounting for the implementation in winch two signals 1218 and 1220 from local oscillator 1210 are connected to the auxiliary PPA 1202 at a phase offset. The above is simple to understand if one realizes that $$Re\{|v(t)|\} = |v(t)|\cos\{\theta(t)\} \quad (29)$$

$$Im\{|v(t)|\} = |v(t)|\sin\{\theta(t)\} \quad (30)$$

The frequency domain representation of pre-cancellation signal y(t) is given as $$Y(f) = \mathfrak{I}\{|v(t)|\cos\{\omega_T t + \phi(t-\Delta_2) + \phi_0 + \theta(t)\}] \quad (31)$$

which contains phase modulation in the carrier due to the polar nature of the architecture of transceiver 1200. Define ψ(t) as $$\Psi(t) = v(t)e^{j\{\phi(t-\Delta_2) + \phi_0\}} \quad (32)$$

$$\Psi(t) = [a(t)*\mathfrak{I}^{-1}\{W(f)\}*\mathfrak{I}^{-1}\{S(f)\}]e^{j\{\phi(t-\Delta_2)+\phi_0\}} \quad (33)$$

whose frequency domain representation is given by $$\Psi(f) = [A(f)W(f)S(f)]\mathfrak{I}^{-1}\{e^{j\{\phi(t-\Delta_2)+\phi_0\}}\} \quad (34)$$

Then $$y(t) = Re\{\psi(t)e^{j\omega_0 t}\} \quad (35)$$

$$Y(f) = \frac{\Psi(f-f_T) + \Psi^*(-f-f_T)}{2} \quad (36)$$

Pre-cancellation signal y(t) passes through coupling circuit 526, which imparts an impulse response on its input. Coupling circuit 526 passes its output, cancellation signal c(t), to adder 232. Cancellation signal c(t) is given by $$c(t) = y(t)*\mathfrak{I}^{-1}\{H_c(f)\} \quad (37)$$

and its frequency domain representation is given by $$C(f) = Y(f)H_c(f) \quad (38)$$

where $H_c(f)$ is the impulse response of coupling circuit 526. Adaptive LMS filter 1038 may adjust the I and Q controls of the cancelling path such that the phase of cancellation signal c(f) is 180 degrees phase shifted from the phase of combined aggressor leakage signal z(t).

Adder 232 receives cancellation signal c(t) and aggressor leakage signal z(t) as its inputs, and passes its output, error signal r(r) to LNA 212. Error signal r(t) is given as $$r(t) = z(t) + c(t) \quad (39)$$

$$r(t) = p(t)*h_1(t) + pp(t)*h_2(t) + f(t)*h_3(t) + y(t)*\mathfrak{I}^{-1}\{H_c(f)\} \quad (40)$$

and its frequency domain representation is given by $$R(f) = [X(f)\{PA(f)H_1(f) + H_2(f)\}PPA(f) + F(f)]e^{-j2\pi f\Delta_2} + Y(f)H_C(f) \quad (41)$$

Error signal r(t) enters LNA 212, whose output 226 is split into an I channel path and a Q channel path for auxiliary receiver 228. After mixing using local oscillator 1210 to up-convert to the transmission band, the demodulation brings signals from the transmission band, not the receive band, into the base band. The resulting output $r_b(f)$ from mixers 906 and 908, now down-converted, is called the base band error signal, and is given by $$r_b(t) = \gamma r(t)e^{-j\omega_T t} \quad (42)$$

where γ represents the gain of LNA 212. A byproduct of many reception circuits is the addition of a. DC-offset in the down conversion process. This addition is represented by adders 914 and 916, whose output is error signal e(t). With the addition of this DC offset, error signal e(t) is the error signal for the adaptive algorithm, and is given as $$e(t) = r_b(t) + dc(t) \quad (43)$$

where the DC offset may change every time local oscillator 1210 is re-locked. The DC offset is added independently on the I and Q paths and can be expressed as $$dc(t)=Re\{dc(t)+jIm\{dc(t)\}=dc_I(t)+jdc_Q(t) \quad (44)$$

Error signal e(t) is converted from analog to digital using ADC 918 and ADC 920 and then pass through RCF 922 and 924, respectively. RCF 922 and RCF 924 pass their output, digitized error signal $\vec{e}(n)$, to adaptive LMS filter 1038. Digitized error signal $\vec{e}(n)$ is used by adaptive LMS filter 1038 to update the weights of adaptive LMS filter 1038. The update equation, is given as $$\vec{w}(n+1)=\vec{w}(n)+\mu e(u)\vec{x}(u) \quad (45)$$

where vector quantities are digital signal vectors, n represents the time index relevant to the update rate of the finite impulse response coefficients within adaptive LMS filter 1038, and μ is a constant that is used to control the rate of convergence. The algorithm will converge when $$E\{\vec{w}(n+1)-\vec{w}(n)\}\to 0 \quad (46)$$

This is possible if and only if the orthogonality condition is met, i.e.

$$e\perp x \quad (47)$$

The adaptive algorithm of adaptive LMS filter 1038 cannot converge if cancellation signal c(t) appears later than combined aggressor leakage signal z(t). To make the system causal, delay module 1206 delays amplitude signal a(t) and phase signal φ(t). Therefore, cancellation signal c(t) appears before any signals based on signal x(t) enters duplexer 210, PPA leakage path 1214, or local oscillator leakage path 1216. As long as the leakage signal does not appear earlier than the cancelling signal, the adaptive filter will converge and also automatically match the delay introduced by delay module 1206.

An additional problem may result from the fact that the delay through local oscillator 1219 may experience analog natured variations while the delay in AM path 1208 would be fixed in a digital implementation. The two delays, if unequal, create more energy in the close-in modulation spectrum. In principle, the difference of this energy from what would be the spectral contents with ideally matched amplitude and phase spectrum constitute an error signal which may be minimized through an additional least mean squares algorithm. Therefore, it may be desirable for the transmit path to ensure that the delay in AM path 1208 is equal to the delay in local oscillator 1210.

Figure 11:
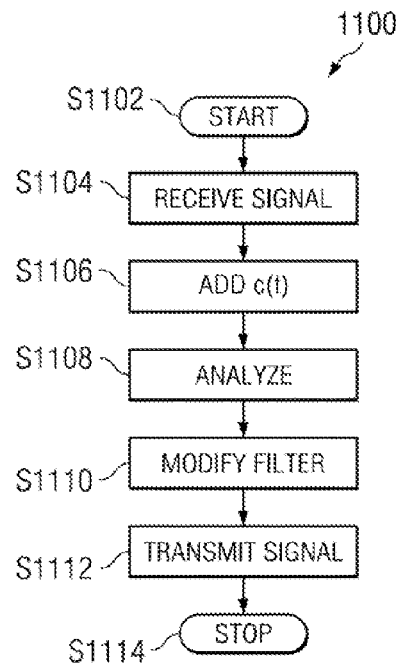
FIG. 11 illustrates a method of operation of full duplex transceiver of FIG. 10.

The above discussed exemplary embodiment of FIGS. 11 and 12 include three sources of parasitic coupling that interfere with the received signal. Of course the present invention may compensate for any number of sources of parasitic coupling. The use of the auxiliary receiver and transmitter to generate a compensating signal of the present invention is adaptable for any number or type of parasitic coupling.

An auxiliary transmitter and auxiliary receiver in accordance with exemplary embodiments of the present invention, which may together be referred to as an auxiliary transceiver, may be fully operable at all times that the main transmitter and main receiver are operable. In other exemplary embodiments, the auxiliary transceiver can be fully turned OFF to conserve power.

In one embodiment of the present invention, enabling or disabling the auxiliary transceiver is based on the power of the transmitted signal from the main transmitter. For example, the auxiliary transceiver might be enabled, only when power of the transmitted signal from the main transmitter is higher than a predetermined minimum threshold, $P_{min}$. In order to avoid fast switching of the auxiliary transceiver around $P_{min}$, a hysteresis mechanism may be employed whereby the threshold for turning the auxiliary transceiver OFF, $P_{min-low}$, can be made smaller than the threshold for turning the auxiliary transceiver ON, $P_{min-high}$.

In yet another exemplary embodiment of the present invention, the auxiliary transceiver may be turned OFF during periods of fast channel fading. For example, digital base-band algorithms in a receiver may detect periods of fast fading and react accordingly. Alternatively, the LMS algorithm can be 'frozen' during periods of fast fading. While frozen, the coefficients of the LMS filter are not updated.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The exemplary embodiments, as described above, were chosen and described in order to best explain the principles of the invention and its practical application to thereby enable others skilled, in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A device for use with a transmission signal generator operable to generate a transmission signal and an antenna operable to transmit a transmit signal and to receive a reception signal, said device comprising:
    a first transmitter operable to generate an output signal based on the transmission signal;
    a second transmitter operable to generate a cancellation signal;
    a duplexer operable to receive a first signal, to receive a second signal, to separate the second signal from the first signal and to generate a duplexed signal, the first signal being based on the output signal and the second signal being based on the reception signal;
    a combiner operable to combine a third signal and a fourth signal and to generate a received signal, the third signal being based on the cancellation signal and the fourth signal being based on the duplexed signal;
    a first receiver operable to receive a fifth signal based on the received signal; and
    a second receiver in communication with said second transmitter and operable to receive a sixth signal and to generate a control signal, the sixth signal being based on the received signal,
    wherein the cancellation signal is based on the control signal, and
    wherein a portion of the received signal includes interference based on the first signal.

2. The device of claim 1, wherein said second receiver comprises:
    a preprocessor portion operable to receive the sixth signal and to generate a seventh signal, and
    a cancellation processor operable to generate the control signal based on the seventh signal.

3. The device of claim 2, wherein said cancellation processor comprises an adaptive least mean square filter.

4. The device of claim 1,
wherein said first transmitter comprises a coordinate rotation digital computer operable to provide an amplitude signal and a phase signal,
wherein said second transmitter comprises an an in-phase signal path and a quadrature signal path,
wherein said in-phase signal path is operable to generate an in-phase modulated signal, and
wherein said quadrature signal path is operable to generate a quadrature modulated signal.

5. The device of claim 4,
wherein said second transmitter further comprises an adder operable to add the in-phase modulated signal and the quadrature modulated signal and to generate an added signal, and
wherein the cancellation signal is based on the added signal.

6. The device of claim 1, further comprising a delay unit operable to receive the transmission signal and to generate a delayed transmission signal,
wherein said first transmitter comprises an in-phase signal path and a quadrature signal path,
wherein said in-phase signal path is operable to generate an in-phase modulated signal, and wherein said quadrature signal path is operable to generate a quadrature modulated signal.

7. A system comprising:
a transmission signal generator operable to generate a transmission signal;
an antenna operable to transmit a transmit signal and to receive a reception signal;
a first transmitter operable to generate an output signal based on the transmission signal;
a second transmitter operable to generate a cancellation signal;
a duplexer operable to receive a first signal, to receive a second signal, to separate the second signal from the first signal and to generate a duplexed signal, the first signal being based on the output signal and the second signal being based on the reception signal;
a combiner operable to combine a third signal and a fourth signal and to generate a received signal, the third signal being based on the cancellation signal and the fourth signal being based on the duplexed signal;
a first receiver operable to receive a fifth signal based on the received signal; and
a second receiver in communication with said second transmitter and operable to receive a sixth signal and to generate a control signal, the sixth signal being based on the received signal,
wherein the cancellation signal is based on the control signal, and
wherein a portion of the received signal includes interference based on the first signal.

8. The system of claim 7, wherein said second receiver comprises:
a preprocessor portion operable to receive the sixth signal and to generate a seventh signal, and
a cancellation processor operable to generate the control signal based on the seventh signal.

9. The system of claim 8, wherein said cancellation processor comprises an adaptive least mean square filter.

10. The system of claim 7,
wherein said first transmitter comprises a coordinate rotation digital computer operable to provide an amplitude signal and a phase signal,
wherein said second transmitter comprises an an in-phase signal path and a quadrature signal path,
wherein said in-phase signal path is operable to generate an in-phase modulated signal, and
wherein said quadrature signal path is operable to generate a quadrature modulated signal.

11. The system of claim 10,
wherein said second transmitter further comprises an adder operable to add the in-phase modulated signal and the quadrature modulated signal and to generate an added signal, and
wherein the cancellation signal is based on the added signal.

12. The system of claim 7, further comprising further comprising a delay unit operable to receive the transmission signal and to generate a delayed transmission signal,
wherein said first transmitter comprises an in-phase signal path and a quadrature signal path,
wherein said in-phase signal path is operable to generate an in-phase modulated signal, and wherein said quadrature signal path is operable to generate a quadrature modulated signal.

13. A method of reducing transmit signal interference in a reception signal in a system having a transmission signal generator operable to generate a transmission signal and an antenna operable to transmit the transmit signal and to receive the reception signal, said method comprising:
generating an output signal based on the transmission signal;
generating a cancellation signal;
receiving a first signal based on the output signal;
receiving a second signal based on the reception signal;
separating the second signal from the first signal;
generating a duplexed signal;
combining a third signal and a fourth signal, the third signal being based on the cancellation signal and the fourth signal being based on the duplexed signal;
generating a received signal;
receiving a fifth signal based on the received signal; and
generating a control signal,
wherein the cancellation signal is based on the control signal, and
wherein a portion of the received signal includes interference based on the first signal.

14. The method of claim 13,
wherein said generating an output signal comprises generating an amplitude signal and generating a phase signal, and
wherein said generating a cancellation signal comprises generating an in-phase signal and generating a quadrature signal,
wherein said generating a cancellation signal further comprises adding the in-phase signal and the quadrature signal and generating an added signal, and
wherein the cancellation signal is based on the added signal.

15. The method of claim 13, wherein said generating an output signal comprises generating an in-phase signal and generating a quadrature signal.

16. The method of claim 13, wherein said generating a delayed transmission signal comprises receiving the delayed transmission signal and further delaying the delayed transmission signal.

17. A device for use with a transmission signal generator operable to generate a transmission signal and an antenna operable to transmit a transmit signal and to receive a reception signal, said device comprising:

a first transmitter operable to generate an output signal based on the transmission signal;

a duplexer operable to receive a first signal, to receive a second signal, to separate the second signal from the first signal and to generate an analog duplexed signal, the first signal being based on the output signal and the second signal being based on the reception signal;

a first receiver operable to receive an analog third signal based on the analog duplexed signal; and circuitry operable to receive the analog third signal, to generate a digital control signal based on the analog third signal, to generate an analog cancellation signal based on the digital control signal, and to add the analog cancellation signal to the analog duplexed signal, wherein in a portion of the analog duplexed signal includes interference based on the first signal.

18. The device of claim 17, wherein said circuitry comprises a second receiver, a second transmitter and a combiner, wherein said second receiver is operable to receive the analog third signal and to generate the digital control signal, wherein said second transmitter is operable to receive the digital control signal and to generate the analog cancellation signal, wherein said combiner operable to combine the analog cancellation signal and the analog duplexed signal.

19. The device of claim 18, wherein said second receiver comprises an adaptive least mean square filter; and wherein the duplexor is a full duplexor.

20. The device of claim 17, wherein said first transmitter comprises a phase modulation path operable to generate a first modulating signal having a first phase and a second modulating signal having a second phase, wherein said second transmitter comprises an amplifier having an in-phase signal path and a quadrature signal path, wherein said in-phase signal path is operable to receive the first modulating signal and to generate an in-phase modulated signal, and wherein said quadrature signal path is operable to receive the second modulating signal and to generate a quadrature modulated signal.

21. The device of claim 1, wherein the duplexor is a full duplexor.

22. The system of claim 7, wherein the duplexor is a full duplexor.

23. The method of claim 13, wherein the duplexed signal is generated by a full duplexor.

* * * * *